Patented May 26, 1931

1,807,370

UNITED STATES PATENT OFFICE

JACQUES MARC BERNARD, OF PARIS, FRANCE

PROCESS FOR THE PREPARATION OF VISCOSE

No Drawing. Application filed May 27, 1927, Serial No. 194,851, and in France June 24, 1926.

In the known process for the manufacture of the cellulose compounds designated as viscose which are employed for the manufacture of films, textile filaments and threads, and the like, the cellulose is treated successively by caustic soda (NaOH) and by carbon disulphide for the obtainment of a cellulose compound which is soluble in water.

The present invention relates to an improved process for the manufacture of viscose in which the cellulose is first treated, in a closed rotatable cylinder, with carbon disulphide, then adding a solution of caustic soda (NaOH). A vacuum is then produced for the removal and the recovery of the excess of carbon disulphide. After a short time there is formed a pasty substance, soluble in water, which is then treated by the known methods.

In this manner the labor and apparatus required in the known processes for preparing, grinding and ripening the alkali-cellulose compound are eliminated. A great economy of soda is thus obtained and a considerable part of the carbonate formation in the alkali baths which are exposed to the air is eliminated. Further the formation of hemi-celluloses which may be produced from the soaking operation to the end of the alkali-cellulose ripening is obviated; the formation of sulphocarbonate of sodium is reduced, and the loss of cellulose, which takes place due to the incomplete action of the disulphide upon the alkali-cellulose when the latter is not sufficiently ripened, is eliminated.

By way of example I may operate in the following manner, it being understood that the proportions which are indicated below are not of a limitative nature.

I place in a churning apparatus of 600 liters capacity, 50 kgs. of cellulose containing 10 per cent of moisture, represented for instance by sheets of wood paste cut into pieces having 10 to 20 cm. on a side, or I may employ cellulose of another form such as cotton or the like. The apparatus is set in rotation, and I then add carbon disulphide in excess, so that the cellulose is entirely saturated. The carbon disulphide may be employed in the form of liquid or vapor, or a mixture of the two.

The excess of the carbon disulphide is discharged through an orifice at the bottom, and it is afterwards removed, if necessary, by the use of a vacuum for a few moments only, so as not to dry the cellulose.

When it is found that the cellulose has been well saturated with the carbon disulphide, I add 100–200 liters of caustic soda solution which contains—with a certain excess—the amount of soda (NaOH) which is required to form the xanthate, and the apparatus is rotated more slowly until the xanthate is completely formed.

If necessary, a vacuum is produced during the whole or the last half of this latter operation.

The resulting product is supplied to the mixer, and the proper amount of soda (NaOH) and water is added, so as to obtain after the churning operation a percentage of cellulose as well as a viscosity which corresponds to the use which is to be made of the viscose.

In a modification of the said process, I may employ a closed mixer which is arranged for the supply of the carbon disulphide and for the production of a vacuum therein; I perform all of the aforesaid operations in the said mixer, and the speed of rotation is varied according to the different stages of the operation.

I may further combine the two aforesaid methods by causing the cellulose to absorb the carbon disulphide in the churning apparatus and by then placing the resulting substance, as a whole or by successive fractions, in the mixer which contains the caustic soda solution.

In certain of the known methods for the manufacture of viscose, the cellulose is first mercerized by the caustic soda (NaOH) and this is followed by a washing with water which eliminates the soda used in this treatment as well as the hemi-celluloses. The cellulose thus washed is then subjected to the several treatments in current use, i. e. it is soaked in a caustic soda solution, pressed, torn into fragments and allowed to ripen, these operations preceding the treatment by the carbon disulphide.

The process according to this invention is also applicable to kinds of cellulose which have been subjected to this preliminary treatment, i. e. soaking in a caustic soda solution followed by a washing with water, and after these operations, the cellulose is treated according to my above said process.

Having now described my invention, what I claim as new and desire to secure by Letters Patent is:

1. A process for the manufacture of liquid viscose which consists in impregnating cellulose with carbon disulphide, adding thereto a solution of caustic soda, allowing the caustic soda to transform the cellulose into liquid xanthate of cellulose, and diluting in an aqueous bath to the viscosity of the viscose to be produced, all these operations being performed at ordinary temperature.

2. A process for the manufacture of liquid viscose which consists in impregnating cellulose with carbon disulphide, producing a vacuum for the removal and the recovery of the excess of carbon disulphide, adding to the impregnated cellulose a solution of caustic soda, allowing the caustic soda to transform the cellulose into liquid xanthate of cellulose, and diluting in an aqueous bath to the viscosity of the viscose to be produced, all these operations being performed at ordinary temperature.

3. A process for the manufacture of liquid viscose which consists in impregnating cellulose with carbon disulphide in a rotating closed cylinder, in then adding in said cylinder a solution of caustic soda, stirring said cellulose in said caustic soda to transform said cellulose into liquid xanthate of cellulose, and diluting in an aqueous bath to the viscosity of the viscose to be produced, all these operations being performed at ordinary temperature.

4. A process for the manufacture of liquid viscose which consists in impregnating mercerized cellulose with carbon disulphide, adding thereto a solution of caustic soda, allowing the caustic soda to transform the cellulose into liquid xanthate of cellulose, and diluting in an aqueous bath to the viscosity of the viscose to be produced, all these operations being performed at ordinary temperature.

5. A process for the manufacture of liquid viscose which consists in impregnating cellulose with carbon disulphide, adding thereto a solution of caustic soda, allowing the caustic soda to transform the cellulose into liquid xanthate of cellulose, producing a vacuum for the removal and the recovery of the excess of carbon disulphide, and diluting in an aqueous bath to the viscosity of the viscose to be produced, all these operations being performed at ordinary temperature.

In testimony whereof I have signed my name to this specification.

JACQUES MARC BERNARD.